US011661359B2

(12) United States Patent
Barbour et al.

(10) Patent No.: US 11,661,359 B2
(45) Date of Patent: May 30, 2023

(54) FLUID TREATMENT SYSTEM AND METHOD

(71) Applicant: CWC Clear Water Clarification Technologies Inc., Regina (CA)

(72) Inventors: Blaine Barbour, Macoun (CA); Michael Blair, Weyburn (CA); Vernon John Gattinger, Calgary (CA); Gary William Gough, Loon Lake (CA); Blake Penna, Bienfait (CA); Darren Nigel Valantine, Turner Valley (CA)

(73) Assignee: CWC Clear Water Clarification Technologies Inc., Regina (CA)

( * ) Notice: Subject to any disclaimer, the term of this patent is extended or adjusted under 35 U.S.C. 154(b) by 154 days.

(21) Appl. No.: 16/854,591

(22) Filed: Apr. 21, 2020

(65) Prior Publication Data

US 2020/0339448 A1    Oct. 29, 2020

Related U.S. Application Data

(60) Provisional application No. 62/838,866, filed on Apr. 25, 2019.

(51) Int. Cl.
| | |
|---|---|
| *C02F 1/52* | (2023.01) |
| *B01F 25/312* | (2022.01) |
| *C02F 1/00* | (2023.01) |
| *B01F 101/00* | (2022.01) |

(52) U.S. Cl.
CPC ............ *C02F 1/52* (2013.01); *B01F 25/3121* (2022.01); *B01F 2101/305* (2022.01); *C02F 2001/007* (2013.01); *C02F 2301/08* (2013.01)

(58) Field of Classification Search
CPC ........................................................ C02F 1/52
See application file for complete search history.

(56) References Cited

U.S. PATENT DOCUMENTS

| | | | |
|---|---|---|---|
| 3,523,076 | A | 8/1970 | Goerz, Jr. et al. |
| 3,772,187 | A | 11/1973 | Othmer |
| 3,899,423 | A | 8/1975 | McGrath |
| 3,933,642 | A | 1/1976 | Wilson |
| 4,219,415 | A | 8/1980 | Nassef et al. |

(Continued)

FOREIGN PATENT DOCUMENTS

| | | |
|---|---|---|
| CA | 2212503 | 11/1997 |
| EP | 0787686 A2 | 8/1997 |

(Continued)

OTHER PUBLICATIONS

Search Report dated Aug. 3, 2000 of international application No. PCT/CA 00/00309.

*Primary Examiner* — Peter Keyworth
(74) *Attorney, Agent, or Firm* — Gordon & Jacobson, P.C.

(57) ABSTRACT

Fluid treatment systems and components are provided for a removal of solid matter from water or other fluids in which a chemical or chemicals may be introduced into the fluid under pressure to coagulate and/or conglomerate the solid materials and cause them to be dropped out of the treatment system and be removed. The fluid treatment system can include: an equalization chamber receiving a wastewater; a clarification chamber receiving a partially separated water from the equalization chamber; a mixing tube having an inlet end and an outlet end; and a sludge detector.

18 Claims, 5 Drawing Sheets

(56) References Cited

U.S. PATENT DOCUMENTS

| | | | |
|---|---|---|---|
| 4,225,431 | A | 9/1980 | De Longe |
| 4,357,242 | A | 11/1982 | Chandler |
| 4,451,361 | A | 5/1984 | Paterson |
| 4,501,664 | A | 2/1985 | Heil et al. |
| 5,080,803 | A | 1/1992 | Bagatto et al. |
| 5,407,561 | A | 4/1995 | Iida et al. |
| 5,556,537 | A | 9/1996 | Saarenketo |
| 5,770,056 | A | 6/1998 | Deskins |
| 5,833,865 | A | 11/1998 | Harato et al. |
| 5,904,855 | A | 5/1999 | Manz et al. |
| 6,113,789 | A | 9/2000 | Burke |
| 6,261,446 | B1 | 7/2001 | Cornick |
| 6,902,667 | B1 | 6/2005 | Dunne |
| 2013/0021868 | A1* | 1/2013 | Doolin .................. B01F 23/41 366/154.1 |

FOREIGN PATENT DOCUMENTS

| | | |
|---|---|---|
| WO | 98/38134 A1 | 9/1998 |
| WO | 00/59835 A1 | 10/2000 |

\* cited by examiner

FLUID TREATMENT SYSTEM AND METHOD

CROSS-REFERENCE TO RELATED APPLICATION(S)

This application claims priority to U.S. Prov. Appl. No. 62/838,866 filed on Apr. 25, 2019, the contents of which are herein explicitly incorporated by reference in their entirety.

BACKGROUND

Field

The present application relates to a method and apparatus for a removal of solid matter from water or other fluids in which a chemical or chemicals may be introduced into the fluid under pressure to coagulate and/or conglomerate the solid materials and cause them to be dropped out of the treatment system and be removed.

Related Art

At present, most methods of treatment of water, wastewater, or other effluent are mainframe biological treatments. These systems are costly and highly inefficient, due in part to inefficiencies created by shock loadings which destroy the biological components of the treatment train.

U.S. Pat. No. 6,902,667, the contents of which are herein explicitly incorporated by reference in its entirety, discloses a method and apparatus for the removal of suspended solids from water, wastewater, and other effluents. The raw fluid extracted is placed in a pressurized equalization chamber by a pumping apparatus. The fluid might be ground in advance to reduce a solid particle size suspended therein to a manageable size. Solids settle from the fluid before pumping into a second chamber for further settling. Chemicals are injected between the first chamber and the second chamber. Sludge recovered from a base of the chambers can be sterilized using conventional methods, and a separated fluid discharged from the clarification chamber is further cleaned, also using conventional methods. The method and apparatus of the present replaces or supplements conventional mainframe biological treatments.

SUMMARY

The aspects as described herein in any and/or all combinations comprise the subject matter of the present application.

There is provided a fluid treatment system that may have an equalization chamber receiving a waste water; a clarification chamber receiving a partially separated water from the equalization chamber; a mixing tube having an inlet end and an outlet end; and a sludge detector. The wastewater may comprise water, grit, and sludge. A settlement reservoir may feed the equalization chamber. A pumping system may be configured to feed the equalization chamber. A first fluid transfer conduit may fluidly connect the settlement reservoir to the equalization chamber. The equalization chamber may have a cylindrical top and a conical base. The conical base may have a solids discharge. The first fluid transfer conduit may discharge into the equalization chamber above the conical base. The mixing tube may have a mixing area between the equalization chamber and the clarification chamber. The mixing tube may have a venturi injector for injecting one or more treatment chemicals into the wastewater. The one or more treatment chemicals may be a floc-forming chemical. The first stage fluid transfer conduit may have an internal fighting.

In another aspect, there may be a second fluid transfer conduit between the equalization chamber and the clarification chamber. The second fluid transfer conduit may be fluidly connected to the cylindrical top of the equalization chamber. A venturi injector may inject the one or more treatment chemicals into a partially separated fluid within the second fluid transfer conduit. The second fluid transfer conduit may be longer than the first fluid transfer conduit. The second fluid transfer conduit may extend in a downward spiral around the clarification chamber.

In some aspects, the clarification chamber may have a cylindrical top and a conical base. The conical base may have a discharge for removing solids.

In yet other aspects, there is provided a mixing tube for use in a fluid treatment system. The mixing tube may have an inlet; an outlet; an interior bore between the inlet and the outlet; an injection inlet from the interior bore to an exterior of the mixing tube; a plurality of fins extend along the interior bore and located proximate to the inlet; and a spiral extend along the interior bore and located proximate to the outlet. Either the inlet, the outlet, or both may have a taper. The plurality of fins may extend from the inlet to the injection inlet. The spiral may extend along the interior bore from the injection inlet to the outlet. The interior bore may have a smaller diameter than a fluid transfer conduit of the fluid treatment system. The injection inlet may be angled toward the inlet.

In another aspects, there is provided a sludge detector for use in a water treatment system. The sludge detector may have a cross-tee with a first intersecting bore and a second intersecting bore; a reinforced transparent tube placed within the first intersecting bore extending from an inlet to an outlet; a sensor board placed within a first orifice of the second intersecting bore; and an illumination board placed within a second orifice of the second intersecting bore. A pipe cap may seal at least one of the first orifice and the second orifice. A van stone flange may maintain the reinforced transparent tube within the first intersecting bore. A pair of gaskets may seal the reinforced transparent tube with the van stone flange. A mounting ring may hold the sensor board within a nipple. The illumination board may have one or more illumination sources that emits light over a range of wavelengths selected from at least one of: visible light, infrared light, and ultraviolet light. The sensor board may have one or more one photoreceptive sensor sensitive to at least one range of wavelengths of light. The one or more photoreceptive sensor may be an image sensor.

In still other aspects, there is provided a method of fluid treatment. The method may: provide a flow of a raw fluid into an inlet to an equalization chamber; settle solids from the raw fluid to an equalization chamber base; form a partially separated fluid within an equalization chamber top portion; fluidly couple an outlet of the equalization chamber to an inlet of a clarification chamber to provide the partially separated fluid to the clarification chamber; inject at least one chemical treatment into the partially separated fluid as the partially separated fluid passes from the equalization chamber to the clarification chamber; generate a cylindrical fluid flow pattern within at least one of: the equalization chamber and the clarification chamber; settle additional solids from the partially separated fluid to a clarification chamber base; and remove the solids from the base of the equalization chamber and the clarification chamber. The method may also include pumping the raw fluid into the equalization chamber. The flow of the raw fluid may be provided to the equalization chamber using a first stage fluid transfer conduit. The flow of the partially separated fluid may be provided to the clarification chamber using a second stage fluid transfer conduit. The cylindrical fluid flow pattern within the equalization chamber may be generated by angling the first stage fluid transfer conduit towards a wall of the equalization chamber. The cylindrical fluid flow pattern within the clarification chamber may be further enhanced with a downward spiral in the second stage fluid transfer conduit.

According to yet other aspects, there is provided a fluid treatment system having: an equalization chamber receiving a waste water; a clarification chamber receiving a partially separated water through a mixing tube from the equalization chamber; and the mixing tube having an inlet and an outlet. The equalization chamber may have a cylindrical top and a conical base. The conical base may have a solids discharge. A first fluid transfer conduit may discharge into the equalization chamber above the conical base. The mixing tube may have a mixing area between the equalization chamber and the clarification chamber. A venturi injector may inject at least one treatment chemical into the wastewater within the mixing tube. The at least one treatment chemical may comprise a floc-forming chemical. A first stage fluid transfer conduit may have an internal fighting. A second fluid transfer conduit may be between the equalization chamber and the clarification chamber. The second fluid transfer conduit may be fluidly connected to the cylindrical top of the equalization chamber. The second fluid transfer conduit may be longer than the first fluid transfer conduit. The second fluid transfer conduit may extend in a downward spiral around the clarification chamber. The clarification chamber may have a cylindrical top and a conical base.

The fluid treatment system may include the mixing tube that may have an interior bore between the inlet and the outlet; an injection inlet from the interior bore to an exterior of the mixing tube; a plurality of fins extend along the interior bore and located proximate to the inlet; and a spiral extend along the interior bore and located proximate to the outlet. At least one of: the inlet and the outlet may have an interior taper. The plurality of fins may extend from the inlet to the injection inlet. The spiral may extend along the interior bore from the injection inlet to the outlet. The interior bore may have a smaller diameter than a fluid transfer conduit of the fluid treatment system. The injection inlet may be angled toward the inlet.

The fluid treatment system may include a sludge detector that may have a cross-tee with a first intersecting bore and a second intersecting bore; a reinforced transparent tube placed within the first intersecting bore extending from an inlet to an outlet; a sensor board placed within a first orifice of the second intersecting bore; and an illumination board placed within a second orifice of the second intersecting bore. A van stone flange may maintain the reinforced transparent tube within the first intersecting bore. The illumination board may have one or more illumination sources that emits light over a range of wavelengths selected from at least one of: a visible light, an infrared light, and an ultraviolet light. The sensor board may have at least one photoreceptive sensor sensitive to at least one range of wavelengths of light.

According to yet another aspect, there is provided a fluid treatment system that may have an equalization chamber receiving a waste water; a clarification chamber receiving a partially separated water from the equalization chamber; a mixing tube having an inlet and an outlet between the equalization chamber and the clarification chamber; an interior bore between the inlet and the outlet; an injection inlet from the interior bore to an exterior of the mixing tube; a plurality of fins extend along the interior bore and located proximate to the inlet; and a spiral extend along the interior bore and located proximate to the outlet. The equalization chamber may have a cylindrical top and a conical base with a solids discharge; and a first fluid transfer conduit discharges into the equalization chamber above the conical base. The mixing tube may have a mixing area between the equalization chamber and the clarification chamber. The mixing tube may have a venturi injector for injecting at least one treatment chemical into the wastewater within the mixing tube; and the at least one treatment chemical can include a floc-forming chemical. The fluid treatment system may further include a second fluid transfer conduit between the equalization chamber and the clarification chamber. The second fluid transfer conduit may be fluidly connected to the cylindrical top of the equalization chamber. The second fluid transfer conduit may be longer than the first fluid transfer conduit. The second fluid transfer conduit may extend in a downward spiral around the clarification chamber.

According to another aspect, there is provided a mixing tube for use in a fluid treatment system. The mixing tube may have an inlet; an outlet; an interior bore between the inlet and the outlet; an injection inlet from the interior bore to an exterior of the mixing tube; a plurality of fins extend along the interior bore and located proximate to the inlet; a spiral extend along the interior bore and located proximate to the outlet; and wherein at least one of the inlet and the outlet can have a taper. The plurality of fins may extend from the inlet to the injection inlet. The spiral may extend along the interior bore from the injection inlet to the outlet. The injection inlet may be angled toward the inlet.

In yet another aspect, there is provided a sludge detector for use in a water treatment system. The sludge detector may have a cross-tee with a first intersecting bore and a second intersecting bore; a reinforced transparent tube placed within the first intersecting bore extending from an inlet to an outlet. In some aspects, a sensor board may be placed within a first orifice of the second intersecting bore; and an illumination board placed within a second orifice of the second intersecting bore. A van stone flange may maintain the reinforced transparent tube within the first intersecting bore. The illumination board may include an illumination source that emits light over a range of wavelengths selected from at least one of: a visible light, an infrared light, and an ultraviolet light; and the sensor board may include at least one photoreceptive sensor sensitive to at least one range of wavelengths of light.

DESCRIPTION OF THE DRAWINGS

Example aspects are provided in the accompanying detailed description which may be best understood in conjunction with the accompanying diagrams where like parts in each of the several diagrams are labeled with like numbers.

FIG. 2A shows the equalization chamber, and FIG. 2B shows the clarification chamber.

FIG. 3A is a side view of the mixing tube, FIG. 3B is a view of the inlet end, and FIG. 3C is a view of the outlet end.

DETAILED DESCRIPTION

Figure 1:
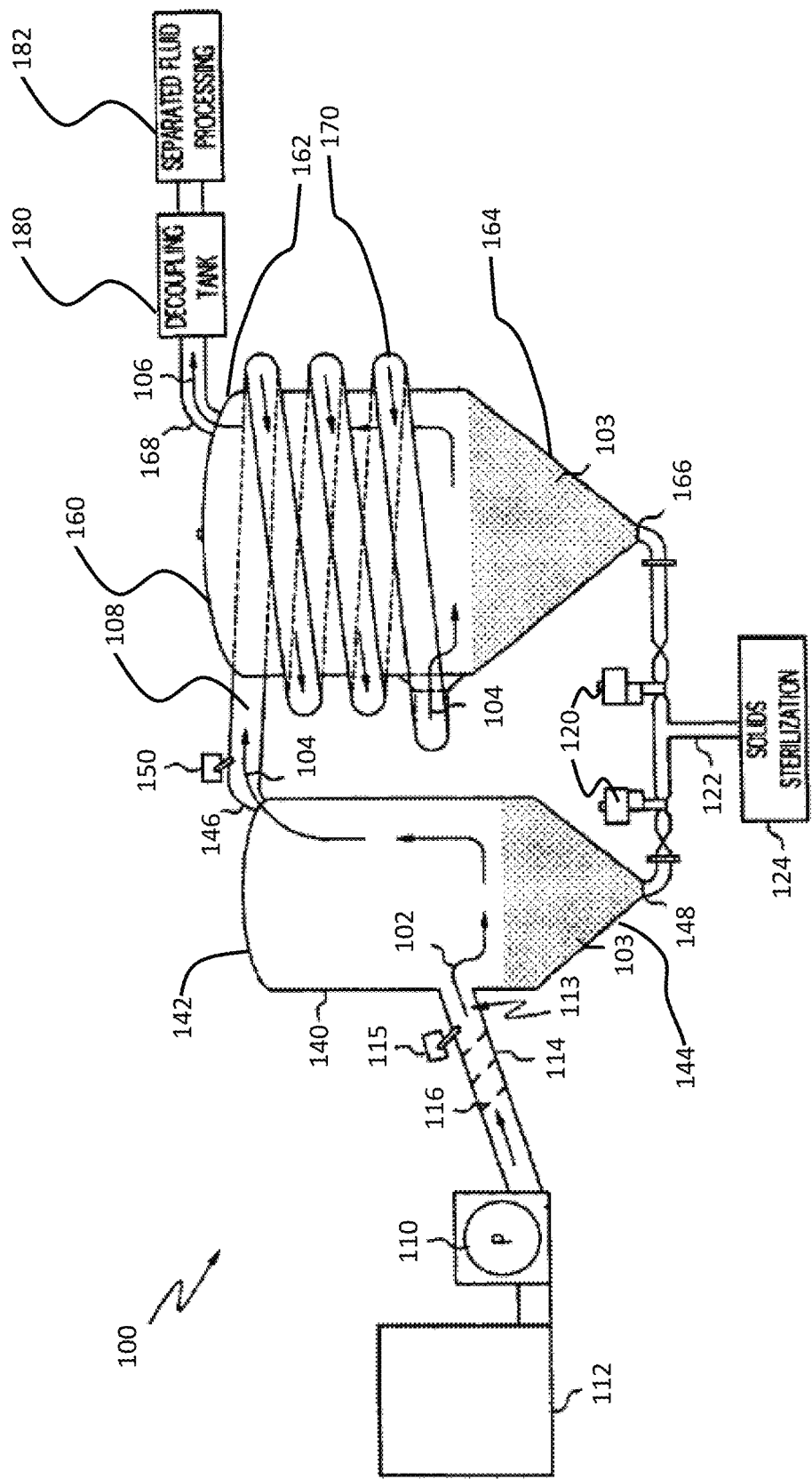
FIG. 1 shows a fluid treatment system having an equalization chamber and a clarification chamber.

According to FIG. 1, a fluid treatment system 100 may remove suspended solids from wastewater 102 and/or other effluents. The fluid treatment system 100 may be used to separate any approximately solid fractions from the wastewater 102 and/or other fluids. The solid fraction may comprise a combination of grit and sludge. The combined grit and sludge that may be carried by a raw fluid may be referred to as raw solids.

In some aspects, a raw wastewater collection system (not shown), including a gravity collection system, may provide the wastewater 102 to a settlement reservoir 112. In another aspect, the source water 102 may be drawn from a lake, river, or other source. In some aspects, a pH reading may be obtained from the wastewater 102 using a pH sensor 190, shown in FIG. 2A. In other aspects, further sensor reading may be obtained from the waste water 102, such as metals, inorganic chemicals, bacteria, pathogens, volatile organic chemicals, iron content, hardness, contaminants, etc., and may be used to control and/or determine treatment options of the fluid treatment system 100.

The fluid treatment system 100 may generally include a pumping system 110 that may pump the wastewater 102 from the settlement reservoir 112 (or other fluid source) into an equalization chamber 140 by way of a first fluid transfer conduit 114. The equalization chamber 140 may include a generally cylindrical top 142 and a generally conical base 144. The solid waste may settle to a solids discharge 148 wherein the settled solids may be removed from the base 144 of the equalization chamber 140. In some aspects, the settled solids may comprise grit and/or solids that may settle out within the equalization chamber 140, for removal at the base 144. The first fluid transfer conduit 114 may discharge into the equalization chamber 140 above the conical base 144.

One or more chemicals may be injected prior to a mixing area 113 (or tube) and/or within the mixing area 113 between the pumping system 110 and the equalization chamber 140. The chemicals may be injected using a Mazzei® injector 115 (e.g. a venturi injector), which may provide a suitable chemical injection apparatus for use at this stage in the system 100. In particular, the fluid 102 contaminated by oil and/or grease may first be treated by injecting one or more floc-forming chemicals prior to the fluid 102 entering the equalization chamber 140.

An interior of the first stage fluid transfer conduit 114 might be fitted with internal fighting 116 (e.g. one or more fins, baffles, and/or internal features as described herein) to provide more aggressive and/or improved mixing and/or floc forming conditions. The first stage fluid transfer conduit 114 may provide the mixing area 113 for mixing the raw fluid 102 and the floc-forming chemicals before the raw fluid 102 enters into the equalization chamber 140.

A second fluid transfer conduit 146 may discharge a partially separated fluid 104 from the equalization chamber 140. In this aspect, the second fluid transfer conduit 146 may be fluidly connected to the cylindrical top 142 of the equalization chamber 140. In some aspects, the second fluid transfer conduit 146 may be fluidly connected to an uppermost portion of the cylindrical top 142. The second fluid transfer conduit 146 may include one or more chemical injection systems 150, such as venturi injectors, that may inject one or more chemicals into the partially separated fluid 104 as the fluid 104 passes through the conduit 146. In this aspect, the chemicals injected by the Mazzei injector 115 and/or the injection systems 150 may be alum, polyaluminum chloride, and/or any other chemical and/or additive used to enhance floc formulation, and/or otherwise treat effluents in advance of solid separation at either stage.

A mixing ability of the second fluid conduit 146 may be increased by extending a length of the conduit 146. In this aspect, the length of the conduit 146 may be increased by using a downward spiral 170 around a clarification chamber 160 in order to reduce a footprint of the fluid treatment system 100. Other aspects may have the spiral 170 extend above a top of the clarification chamber 160.

In this aspect, the chemical injection system 150 may also include a Mazzei injector and/or another injector capable of a high-pressure deep injection of chemicals into the partially separated fluid 104. A high-pressure jet of chemicals may provide a maximum penetration and/or mixing of the chemicals with the partially separated fluid 104. In the aspect with the spiral 170, a plurality of injection systems 150 may inject chemicals at various points along the spiral 170.

Similar to the equalization chamber 140, a clarification chamber 160 may have a generally cylindrical top 162 and a generally conical base 164. The solid waste, such as sludge created from the oil and/or grease, may settle to a solid discharge 166 wherein the settled solids may be removed from the base 164 of the clarification chamber 160. A separated fluids discharge 168 may be located at or near the top 160 of the clarification chamber 160. The separated fluids discharge 168 may allow for separated fluid 106 to exit from the clarification chamber 160. The treated water 106 may contain minimal amounts of oil and/or grease and may be safely discharged to the environment.

A flow of the raw fluid 102 through the fluid treatment system 100 to become clean fluid 106 may be demonstrated as follows. The raw fluid 102 may be pumped from the settlement reservoir 112 by the pumping apparatus 110 into the equalization chamber 140 via the first stage fluid transfer conduit 114. In some aspects, the treatment chemicals may be added to the first stage fluid transfer conduit 114 based, in part, on sensor measurements. Once the raw fluid 102, which contains the raw solids 103, enters the equalization chamber 140, a portion of the raw solids 103 may settle to the base 144 of the equalization chamber 140, for eventual removal as equalization discharged solids. The fluid remaining, which may still contain some amount of the raw solids 103 may become partially separated fluid 104 and may exit the equalization chamber 140 via the second stage fluid transfer conduit 146 to be pumped into the clarification chamber 160. In this aspect, a pressure in the equalization chamber 140, the clarification chamber 160, the first stage fluid transfer conduit 114, and/or the second stage fluid transfer conduit 116 may be provided by the pump 110.

A circular or cylindrical fluid flow pattern may be generated within the equalization chamber 140 by aiming an entry of the first stage fluid transfer conduit 114 in the direction (e.g. tangent) of a cylindrical wall of the equalization chamber 140. The circular fluid flow may assist in generating a vortex further forcing the raw solids towards the conical base 144 of the chamber 140. A similar effect may be accomplished in the clarification chamber 160 by the second stage fluid transfer conduit 146, which may be further enhanced with the downward spiral 170 in the second stage fluid transfer conduit 146. Within the equalization chamber 140, the pressure and gravity, coupled with the circular motion of the fluid 102 created by angling an entry of the first stage fluid transfer conduit 114 towards the wall of the cylindrical chamber 140, may create a downward pressure resulting in the settling of solids 103 from the fluid 102.

The pressure generated by the pumping system 110 may produce sufficient pressure to induce the partially separated fluid 104 into the clarification chamber 160, after receiving a rapid and forceful injection of chemical treatment as described in more detail below. Upon exiting the equalization chamber 140 via the second stage fluid transfer conduit 146, the partially separated fluid 104 may be injected with the one or more chemicals by the second stage chemical injection apparatus 150 before the fluid 104 enters into the clarification chamber 160. The chemically treated partially separated fluid 104 may move through lengthened portions of the second stage fluid transfer conduit 146 which may allow time for floc formulation in advance of entry into the clarification chamber 160.

Once inside the clarification chamber 160, a remainder of the solids 103 may settle to the base 164 of the clarification chamber 160 for eventual removal as clarification discharged solids via the clarification solids discharge 166. In some aspects, a majority of the remaining solids 103 may then settle to the base of the clarification chamber 160. The recovered sludge 103, that may contain hydrocarbons, may be used as a fuel for steam generation or other uses.

At this point, the separated fluid 106 may exit from the clarification chamber 160 via the separated fluid discharge 168 at or near the top thereof 162. The clarified water 106 may move into a decoupling tank 180 and may be processed using a sand filtration system 182 where the remaining solids or impurities may be removed. The water may then be chlorinated or handled through a MIOX® system (not shown), to yield treated potable water.

The entire system 100 (e.g. the chambers 140, 160, the fluid transfer conduits 114, 146, and/or the fluid discharge 168) may be pressurized by the pumping apparatus 110 and the entire system 100 beyond the pumping apparatus 110 to at least the separated fluid discharge 168 remains pressurized throughout operation. For example, the removal of separated fluid 106 via the separated fluids discharge 168 and/or the removal of solids by either the equalization solids discharge 148 or the clarification solids discharge 168 may not adversely affect an internal system pressure.

The second stage chemical injection apparatus 150 may place chemicals into the partially separated fluid 104 and may ensure an even distribution and/or mixing of these chemicals into the partially separated fluid 104. This distribution and/or mixing may be performed by providing such a mixing tube 108 within the second stage fluid transfer conduit 146 to allow for a space within which the chemicals and the partially separated fluid 104 may co-mingle in advance of entry into the clarification chamber 160 and/or the spiral 170. The mixing of the fluid and the chemicals within the second stage fluid transfer conduit 146 may also allow for proper floc formulation.

Both the equalization solids discharge 148 and the clarification solids discharge 168 may have valves 120. These valves 120 may be opened and the solids 103 contained at the base 144, 164 of their respective chambers 140, 160 may then be evacuated therefrom using the internal system pressure provided by the pump 110. While valves 120 may be particularly contemplated for use as the discharges 148, 168, other various types of gates and/or dispensing systems may also be used with similar results. The solid discharges 148, 168 may include a single solids discharge conduit 122 that may gather solids 103 off of both the equalization solids discharge 148 and the clarification solids discharge 168. The single solids discharge conduit 122 may then lead into a downstream solids sterilization system 124.

The downstream solids sterilization system 124 may include any number of different sterilization apparatuses, such as for example, a pasteurizer, a storage tank, a digester, and/or some other sterilizing unit. In some aspects, the sterilization system 124 may include a microwave or ultraviolet light treatment to treat the solids.

Figure 2A:
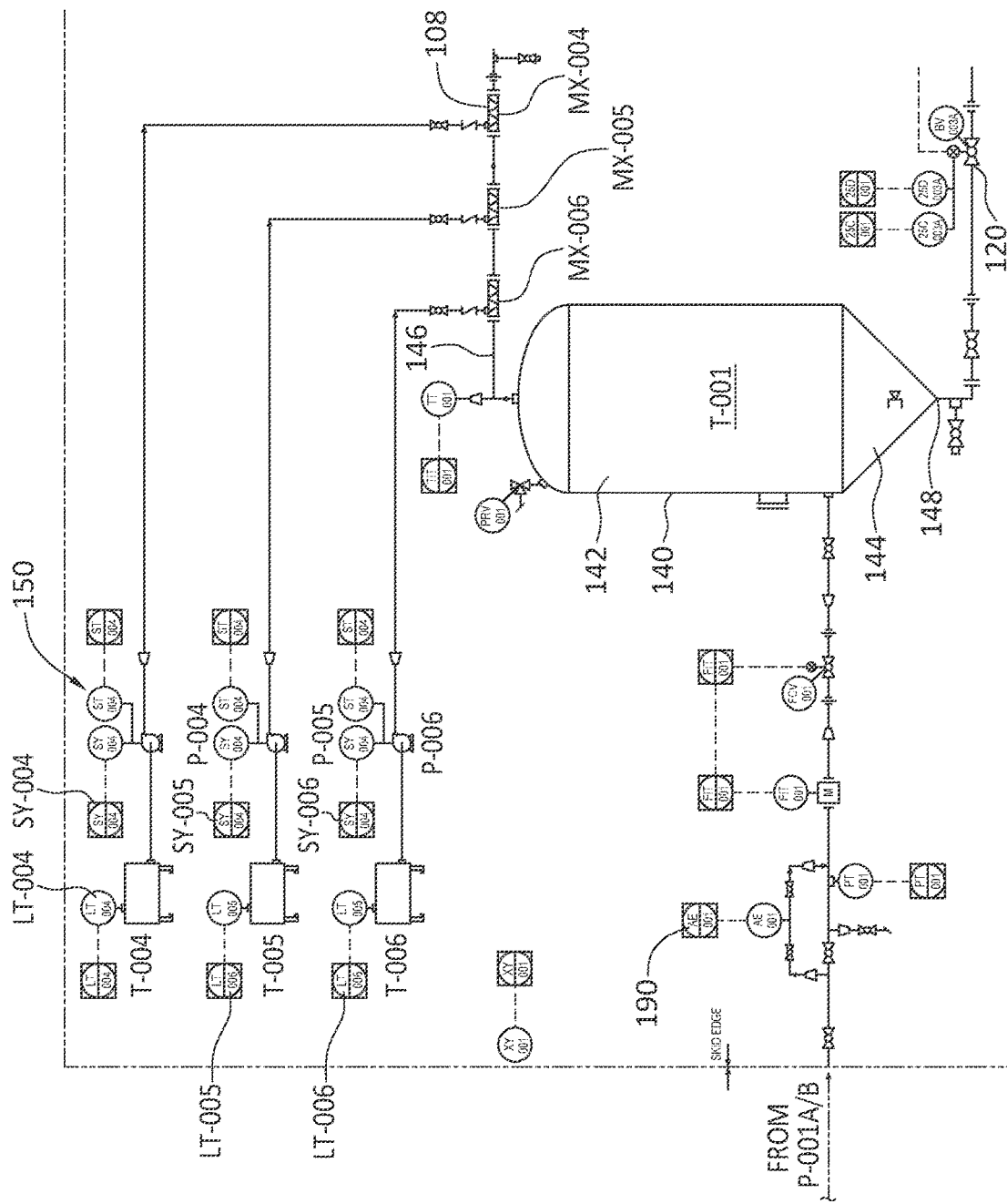
FIGS. 2A and 2B show a more detailed representation of the fluid treatment system of FIG. 1. In particular.
Figure 2B:
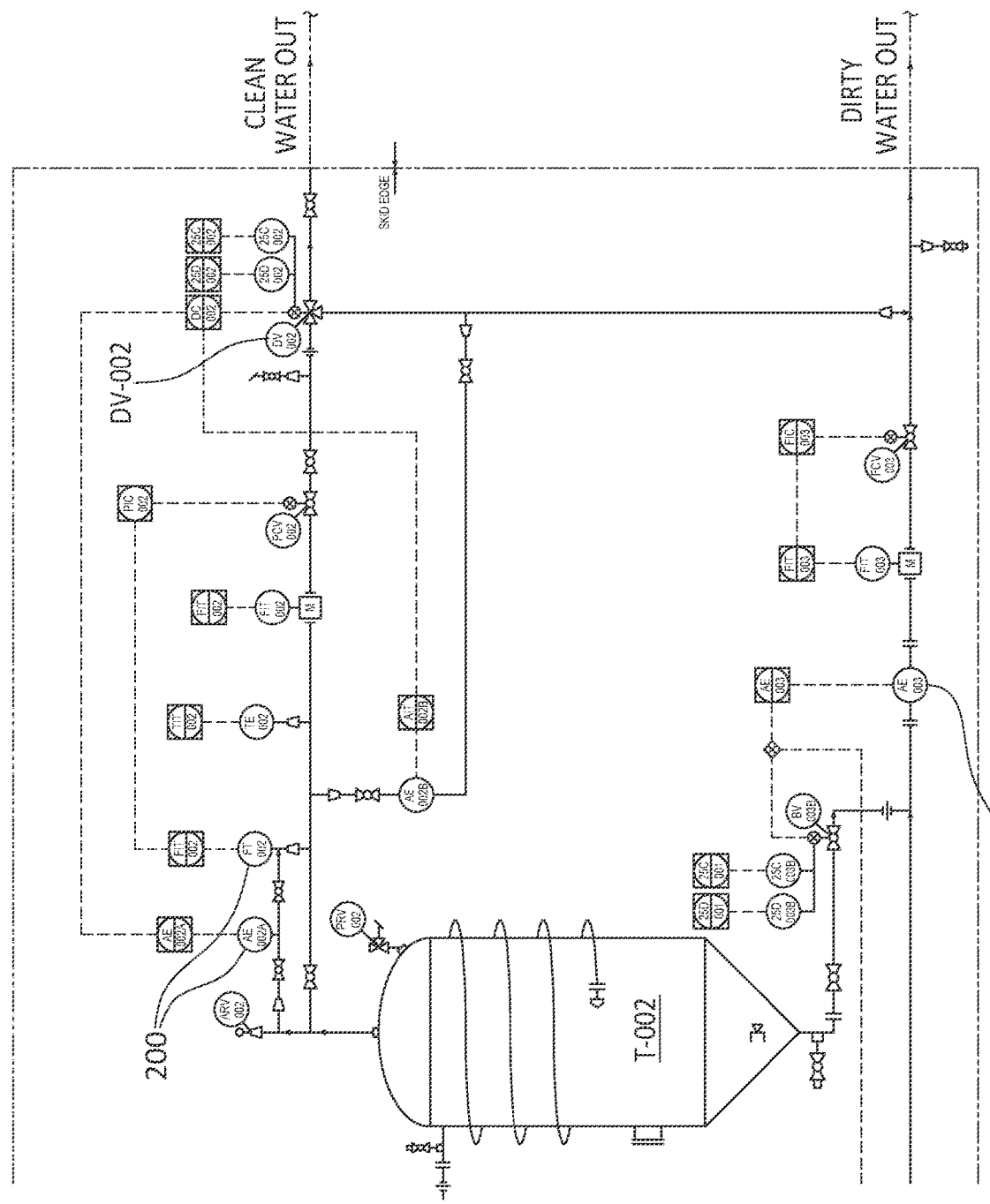

Turning to FIGS. 2A to 2B, further details of the fluid treatment system 100 may be shown. The chemical injection system 150 may include one or more chemical totes T-004 to T-006 holding at least one treatment chemical therein. A level of the chemical may be measured using a chemical tote level LT-004 to LT-006, such that when the level of the chemical runs low, a notification may be sent for a technician to provide additional chemical. In this aspect, three chemical totes T-004 to T006 may provide chemicals to a corresponding number of chemical injectors P-004 to P-006 that pressurizes the chemical before injecting the chemical into the second fluid transfer conduit 146. A speed of the fluid output from each of the chemical injectors P-004 to P-006 may be controlled by a speed controller SY-004 to SY-006.

Figure 3A:
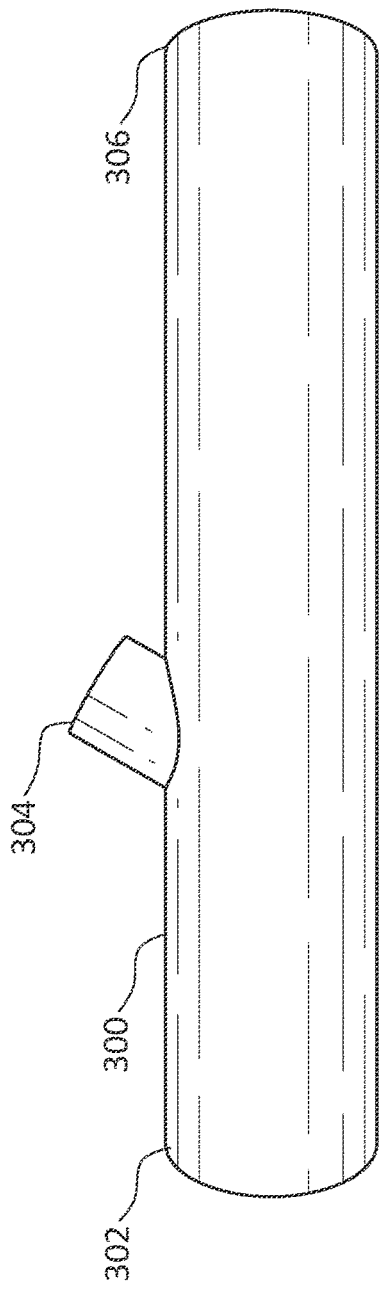
FIG. 3A to 3C shows a mixing tube for mixing fluid and chemicals injected therein. In particular.
Figure 3C:
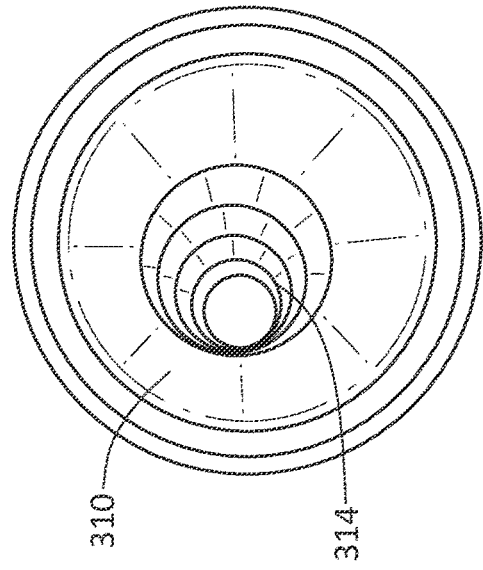

The fluid output from each chemical injector P-004 to P-006 may be injected into a corresponding mixing tube MX-004 to MX-006. The mixing tube MX-004 to MX-006 may be placed in series with the second fluid transfer conduit 146. An example of the mixing tube 300 may be shown more clearly in FIGS. 3A to 3C. The mixing tube 300 may have an inlet 302 and an outlet 306 whereby the partially separated fluid 104 may pass through the mixing tube 300. An injection inlet 304 may receive the chemical injected by the chemical injectors P-004 to P-006.

The inlet 302 and the outlet 306 may have a taper 310 from the exterior of the mixing tube 300 toward an axis of the mixing tube 300. An interior bore 312 of the mixing tube 300 may have a smaller diameter than the second fluid transfer conduit 146. The taper 310 and smaller diameter of the mixing tube 300 may increase a localized velocity and pressure of the partially separated fluid 104 passing through the mixing tube 300. A plurality of fins 308 may be present within the tube 300 following the taper of the inlet 302 to direct the fluid along the tube 300. The fins 308 may extend along the axis of the mixing tube 300 on the interior of the mixing tube 300 to the chemical injection inlet 304. Following the fins 308 and the chemical injection inlet 304, a spiral 314 may be present on the interior bore of the tube 300. The spiral 310 may increase the turbidity of the partially separated fluid 104 and the chemical being injected to increase mixing of the fluid 104 and the chemical. In some aspects, the mixing tube 300 may be 3D printed.

On the outlet 168 of the clarification chamber 160 may be a plurality of sensors 200 for measuring a pH of the clean water, particulate, etc. If the clean water is of unsatisfactory quality, a divert valve DV-002 may return the clean water back to the source and/or may divert the water to the solids discharge conduit 122.

Figure 3B:
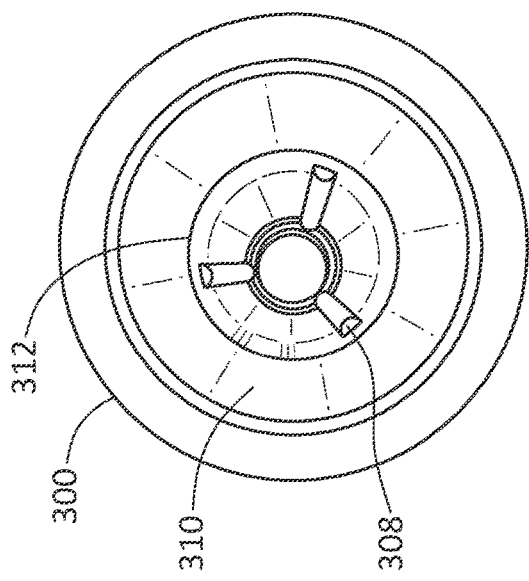
Figure 4:
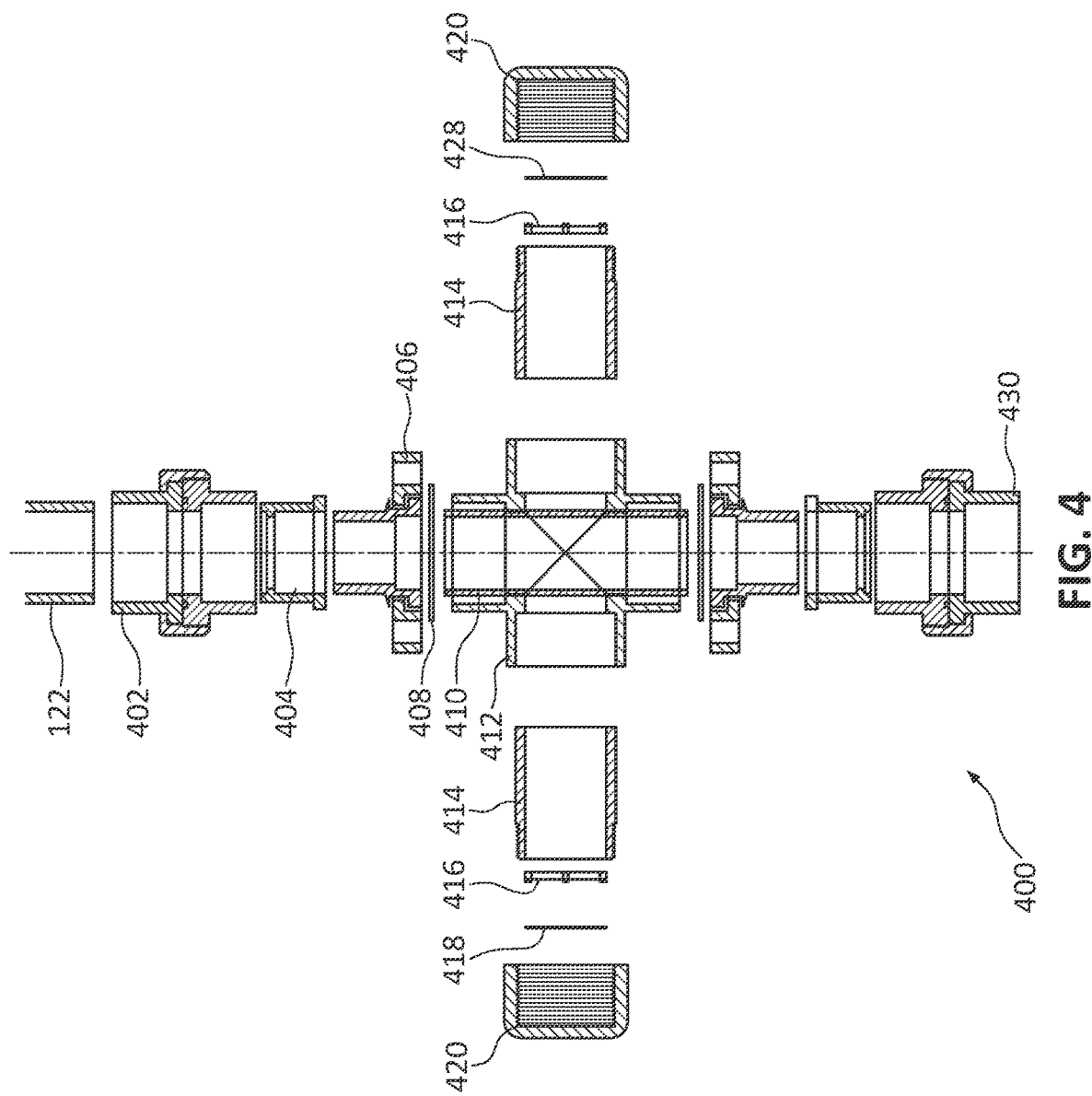
FIG. 4 shows a sludge detector for use with the fluid treatment system.

Turning to FIG. 4, a sludge detector 400 may be used to detect sludge in the solids discharge conduit 122 as shown in FIG. 3B. The sludge detector 400 may be coupled to the solids discharge conduit 122 at an inlet 402 using one or more adapters 404. In another aspect, the sludge detector 400 may be configured to mate with the solids discharge conduit 122 without the adapters 404. The sludge detector 400 may include a cross-tee 412 with four orifices and having a reinforced glass tube 410 placed therein such that the glass tube blocks off two of the orifices. The glass tube 410 may be sized based on an operating pressure of the fluid treatment system 100 such that thicker, stronger glass may be used for higher pressure systems and thinner glass may be used for lower pressure systems. The glass tube 410 may be generally aligned with the flow passing through the solids discharge conduit 122 permitting flow through the sludge detector 400. A van stone flange 406 may be coupled to each of the non-blocked orifices such that a pair of gaskets 408 may seal the glass tube 410 with the van stone flange 406. An outlet 430 of the sludge detector 400 may be an inverse of the inlet 402, such that the sludge detector 400 may be placed inline of the solids discharge conduit 122.

For the connections of the cross-tee 412 that have been blocked with the glass tube 410, a threaded nipple 414 may be threadably coupled to the cross-tee 412. Within the nipple 414 may be a sensor board mounting ring 416 in which an illumination board 418 may be inserted. A pipe cap 420 may seal the orifice from the environment. The illumination board 418 may provide illumination through the glass tube 410 and the fluid therein to be received by a corresponding sensor board 428. The illumination board may include one or more light emitting diodes (LEDs) (not shown). In some aspects, the illumination board 418 may selectively provide illumination over a range of wavelengths of light (e.g. visible (red-green-blue RGB), infrared, and/or ultraviolet) and the sensor board 428 may include one or more photo-receptive sensors capable of determining a reception of the range of wavelengths of light. The sensor board 428 may include one or more filters to filter the light from the LEDs. In some aspects, the filters may be a coating applied to the glass tube 410. In some aspects, the sensor board 428 may include an image sensor capable of taking a plurality of images of the light passing through the glass tube 410. These images may be provided to a computer system for viewing by a technician or operator.

Although the aspects herein describe the sludge detector 400 to detect sludge in the solids discharge conduit 122, other aspects may have the sludge detector 400 between the equalization chamber 140 and the clarification chamber 160. In other aspects, the sludge detector 400 may be on an inlet to the equalization chamber 140 or an outlet of the clarification chamber 160.

Although the fluid treatment system 100 is disclosed herein with reference to the cleaning and the recovery of solids from wastewater 102, the aspects described herein may be used to treat and/or clean other types of effluents. One of skill in the art, upon reading the present description and drawings may understand that all such wastes, fluids, and/or otherwise are intended to fall within the scope as described herein.

The foregoing is considered as illustrative only of the principles of the present application. Further, numerous changes and modifications will readily occur to those skilled in the art upon reading the present description and drawings. The description is not desired to limit the claims to the exact construction and operation shown and described, and accordingly, all such suitable changes or modifications in structure or operation which may be resorted to are intended to fall within the scope of the claims. Any and/or all aspects described herein may be used in any and/or all combinations.

The invention claimed is:

1. A fluid treatment system comprising:
   an equalization chamber receiving a waste water and separating the waste water into a partially separated water;
   a mixing tube comprising a tapered inlet, a tapered outlet, and an interior bore therebetween having a smaller diameter than a fluid transfer conduit of the equalization chamber to alter a flow of the partially separated water therethrough, wherein the mixing tube is configured to receive the partially separated water from the fluid transfer conduit of the equalization chamber through the tapered inlet,
   wherein the interior bore has a plurality of fins formed of and extending longitudinally along a surface of the interior bore and located proximate to the inlet to direct the partially separated water along the interior bore, wherein a spiral is formed of and extending along the surface of the interior bore to increase turbidity and located proximate to the tapered outlet, and wherein an injection inlet that is located between the plurality of fins and the spiral and leading from the interior bore to an exterior of the mixing tube is configured to receive at least one treatment chemical that mixes into the partially separated water to produce a floc forming mixture;
   a clarification chamber receiving the floc forming mixture from the tapered outlet of the mixing tube; and;
   a sludge detector.

2. The fluid treatment system according to claim 1, wherein the equalization chamber comprises a cylindrical top and a conical base.

3. The fluid treatment system according to claim 2, wherein the conical base comprises a solids discharge.

4. The fluid treatment system according to claim 2, wherein a first fluid transfer conduit discharges into the equalization chamber above the conical base.

5. The fluid treatment system according to claim 4, wherein the first fluid transfer conduit comprises an internal fighting.

6. The fluid treatment system according to claim 5, wherein the fluid transfer conduit is fluidly connected to the cylindrical top of the equalization chamber.

7. The fluid treatment system according to claim 6, wherein the fluid transfer conduit is longer than the first fluid transfer conduit.

8. The fluid treatment system according to claim 7, wherein the fluid transfer conduit extends in a downward spiral around the clarification chamber.

9. The fluid treatment system according to claim 1, wherein the mixing tube further comprises a venturi injector for injecting the at least one treatment chemical into the partially separated water within the mixing tube.

10. The fluid treatment system according to claim 1, wherein the at least one treatment chemical comprises a floc-forming chemical.

11. The fluid treatment system according to claim 1, wherein the clarification chamber comprises a cylindrical top and a conical base.

12. The fluid treatment system according to claim 1, wherein the plurality of fins extend from the tapered inlet to the injection inlet.

13. The fluid treatment system according to claim 1, wherein the spiral extends along the interior bore from the injection inlet to the tapered outlet.

14. The fluid treatment system according to claim 1, wherein the injection inlet is angled toward the tapered inlet.

15. A mixing tube for use in a fluid treatment system, the mixing tube comprising:
   a tapered inlet;
   a tapered outlet;

an interior bore between the tapered inlet and the tapered outlet;

a plurality of fins formed of and extending longitudinally along a surface of the interior bore and located proximate to the inlet to direct a fluid along the interior bore;

a spiral formed of and extending along the surface of the interior bore to increase turbidity and located proximate to the outlet; and an injection inlet located between the plurality of fins and the spiral and leading from the interior bore to an exterior of the mixing tube.

16. The mixing tube according to claim 15, wherein the plurality of fins extend from the tapered inlet to the injection inlet.

17. The mixing tube according to claim 16, wherein the spiral extends along the interior bore from the injection inlet to the tapered outlet.

18. The mixing tube according to claim 15, wherein the injection inlet is angled toward the tapered inlet.

\* \* \* \* \*